United States Patent [19]

Takeuchi et al.

[11] 3,996,578
[45] Dec. 7, 1976

[54] ALARM SYSTEM

[75] Inventors: Takeshi Takeuchi, Yokohama; Hajime Masuda, Tokyo, both of Japan

[73] Assignee: Hochiki Kabushiki Kaisha, Tokyo, Japan

[22] Filed: Dec. 7, 1973

[21] Appl. No.: 422,923

[30] Foreign Application Priority Data

Dec. 22, 1972 Japan .................. 47-146584[U]

[52] U.S. Cl. ........................... 340/416; 340/310 R
[51] Int. Cl.² ............................................. G08B 1/08
[58] Field of Search .......... 340/416, 310, 328, 311; 178/DIG. 1, DIG. 23; 325/308

[56] References Cited
UNITED STATES PATENTS

| | | | |
|---|---|---|---|
| 3,054,858 | 9/1962 | Reid | 325/308 |
| 3,534,161 | 10/1970 | Friesen et al. | 340/310 R |
| 3,668,307 | 6/1972 | Face et al. | 325/308 |
| 3,761,914 | 9/1973 | Hardy et al. | 340/310 R |
| 3,803,491 | 4/1974 | Osborn | 325/308 |

*Primary Examiner*—Thomas B. Habecker
*Attorney, Agent, or Firm*—Haseltine, Lake & Waters

[57] ABSTRACT

In an alarm system utilizing a bidirectional wired television system, there are provided a plurality of alarm signal generators which are located on the subscribers' side, the signal generators generating low frequency alarm signals of the frequencies common to respective group units, the frequencies being different for respective subscribers in respective group units, each alarm signal generator being provided for each subscriber's modulators for respective group units; modulators for respective group units for modulating the low frequency alarm signals from the alarm signal generators with different high frequency carrier signals, and a receiving panel for receiving the modulated alarm signals. The receiving panel is provided with a plurality of demodulators for respective group units, first bandpass filters corresponding to the high frequency carrier signals utilized for modulation and adapted to apply the modulated alarm signals to the demodulators, first display means responsive to the outputs of the demodulators for providing displays for respective group units, a plurality of second bandpass filters corresponding to the low frequencies for respective subscriber's, means to supply the outputs of all demodulators in common to the second bandpass filters, and second display means connected to the outputs of the second bandpass filters for providing second displays for respective subscribers.

3 Claims, 2 Drawing Figures

ALARM SYSTEM

BACKGROUND OF THE INVENTION

This invention relates to an alarm system utilizing a bidirectional wired television system.

According to already proposed alarm system utilizing a CATV system, the alarm signals. According to this system, the alarm signals from respective subscriber's ends are sent out from an alarm transmitter as low frequency signals having different frequencies for respective subscribers and the low frequency signals are grouped for suitable blocks and are modulated with high frequencies which are different for respective blocks to form incoming signals which are transmitted to an alarm receiving panel. The alarm receiving panel is provided with a circuit for discriminating the subscriber's ends of the groups of subscriber's ends on the transmission side. This discriminating circuit comprises a demodulator including a high frequency band pass filter and a plurality of low frequency band-pass filters. The demodulator which is provided with the high frequency bandpass filter functions to demodulate modulated signals which have been modulated with high frequencies different for respective groups as described above. Accordingly, it is necessary to use a plurality of demodulators of the same number as that of the modulators. Signals grouped into a plurality of blocks by the demodulators provided with bandpass high frequency filters are finally separated by a plurality of low frequency bandpass filters to operate respective display devices respectively corresponding to the original subscriber's ends.

This system, however, requires the use of a plurality of low frequency bandpass filters and display devices for each demodulator. Further, it is also necessary to install a plurality of low frequency bandpass filters and display devices of the same number as that of the subscriber's ends for the receiving panel. Accordingly, as the number of subscriber's ends increases the cost of the alarm system also increases and accurate separation of the signals becomes difficult, thus causing faulty operation as well as erroneous display.

SUMMARY OF THE INVENTION

Accordingly, it is an object of this invention to provide an improved alarm system utilizing a wired television system capable of utilizing in common the filter and display device for respective demodulators thus eliminating the necessity of providing filters and display devices for respective demodulators.

Another object of this invention is to provide an improved alarm system of the type referred to above which can decrease the number of filters and display devices and yet can correctly transmit and display signals.

Still another object of this invention is to provide an improved alarm system which can be maintained and installed at low cost.

According to this invention, the above and other objects can be accomplished by providing an alarm system utilizing a bidirectional wired television system characterized in that a plurality of alarm signal generators are located on the subscribers side, that the signal generators generate low frequency alarm signal of the frequencies common to respective group units, that the frequencies are different for respective subscribers in respective group units, that each of the alarm signal generators are provided for each of the subscriber's that modulators are provided for respective group units for modulating the low frequency alarm signals from the alarm signal generators with different high frequency carrier signals, that a receiving panel is provided to receive the modulated alarm signals and that the receiving panel is provided with a plurality of demodulators for respective group units, first bandpass filters corresponding to the high frequency carrier signals utilized for modulation and adapted to apply the modulated alarm signals upon the demodulators, first display means responsive to the outputs of the demodulators for providing displays for respective group units, a plurality of second bandpass filters corresponding to the low frequencies for respective subscribers, means to supply the outputs of all of the demodulators in common to the second bandpass filters, and second display means connected to the outputs of the second bandpass filters for providing displays for respective subscribers.

BRIEF DESCRIPTION OF THE DRAWINGS

The invention can be more fully understood from the following detailed description taken in conjunction with the accompanying drawings in which.

DESCRIPTION OF THE PREFERRED EMBODIMENT

Figure 1:
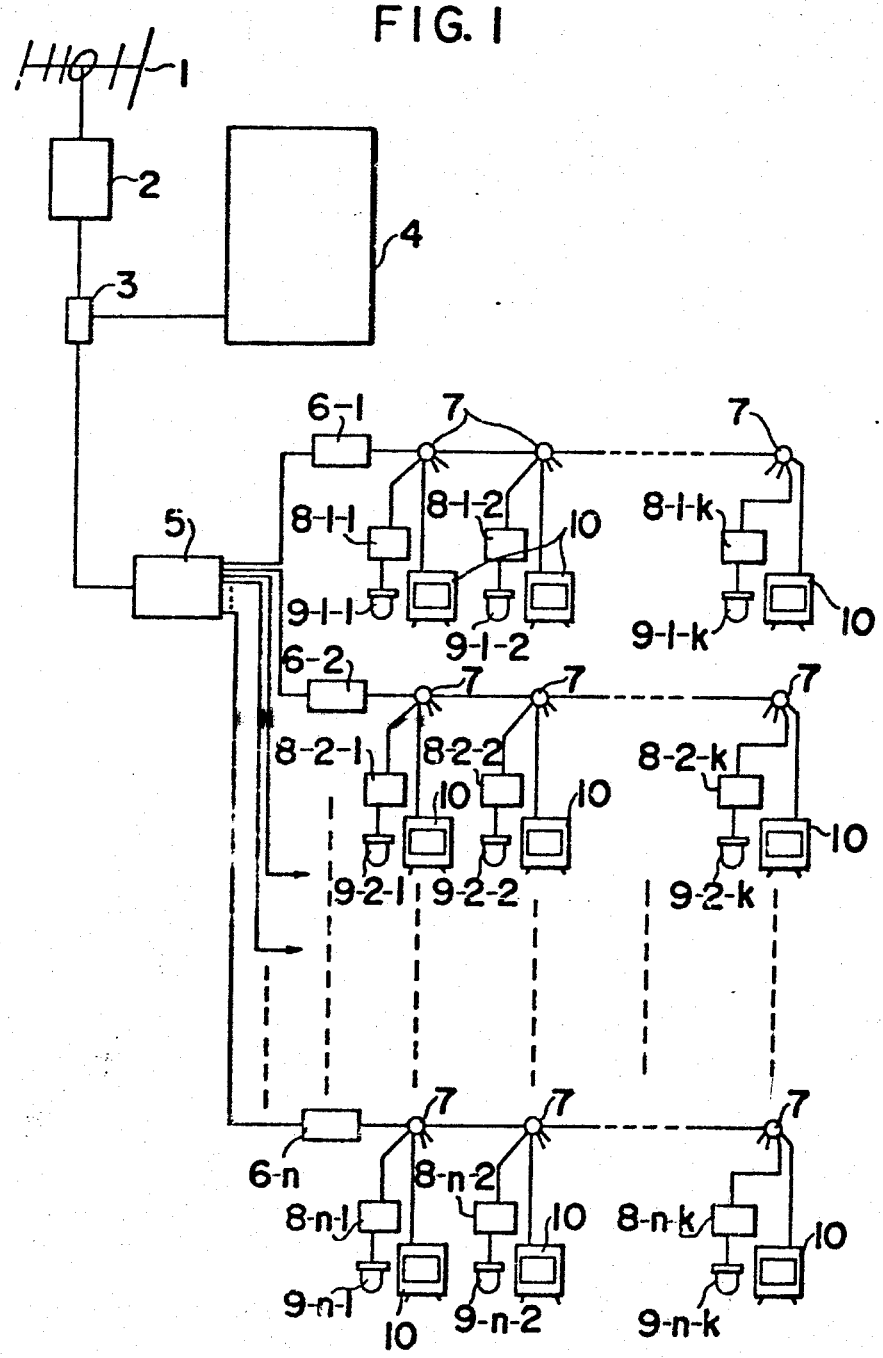
FIG. 1 is a block diagram showing one embodiment of air alarm system utilizing a CATV system, in accordance with the invention

The alarm system shown in FIG. 1 comprises a common television receiving antenna 1, a head end 2, a signal separator 3 for separating television signals and alarm signals, an alarm receiving panel 4 connected to the signal separator 3 to receive the separated alarm signals and a bidirectional bridging amplifier 5 connected to the signal separator 3 to receive the television signals and adapted to pass modulated signals prepared by modulating incoming alarm signals from respective subscriber's ends. There are also provided a plurality of alarm signal modulators 6-$l$ through 6-$n$ which function to modulate low frequency alarm signals generated by alarm signal generators 8-1-1 through 8-$n$-$k$ in respective group units with high frequency carrier signals having different frequencies for respective group units, a plurality of bidirectional splitters 7 for splitting television signals to respective household television receiving sets 10, and a plurality of hazard sensors 9-1-1 through 9-$n$-$k$ (for example smoke sensors) connected to respective alarm signal generators. Each one of the alarm signal generators 8-1-1 through 8-$n$-$k$ is assigned frequencies $f_r$-$f_k$ for respective group units and each subscriber is permitted to use one of these frequencies. Frequencies $F_r$-$F_n$ are assigned to respective group units so that modulators 6-$l$ through 6-$n$ operate to modulate signals generated by respective alarm signal generators and having frequencies $f_r$-$f_k$ with frequencies $F_l$ through $F_k$ respectively.

The head end 2 amplifies and shapes signals and transmits the same to the television receivers through receiving antennas. It is, as is known, composed, for example, of branching filters for branching the receiving signals into each television channel, an amplifier, a mixer, and so forth.

The alarm system described above operates as follows.

The television signals taken as an outgoing signal is received by antenna 1 and are regulated by head end 2. A local broadcasting program or the like is applied directly to the head end 2. These television signals are applied to bidirectional splitters 7 via signal separator 3, bidirectional bridging amplifier 5 and alarm signal modulators 6-$l$ through 6-$n$ without being modulated. Television signals reaching the splitters 7 are splitted to television receiving sets 10 of respective subscribers.

Signals generated by hazard sensors 9-1-1 through 9-$n$-$k$ are applied to respective alarm signal generators 8-1-1 through 8-$n$-$k$ so as to generate low frequency alarm signals having frequencies $f_1$ through $f_k$ respectively. The low frequency alarm signals are sent to respective modulators 6-1 through 6-$n$ via bidirectional splitters 7 to be respectively modulated by frequencies $F_1$ through $F_n$. The modulated alarm signals are then applied to the signal separator 3 through bidirectional bridging amplifier 5 to be separated from television signals. The separated alarm signals are applied to the receiving panel 4.

Figure 2:
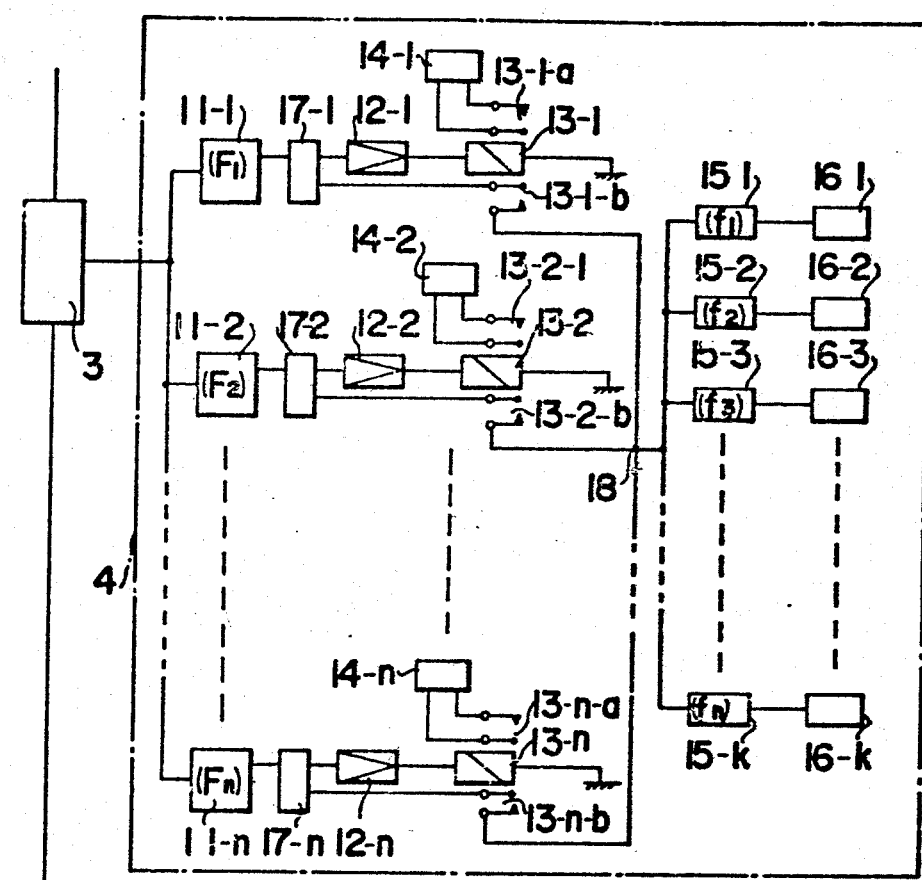
FIG. 2 is a block diagram showing a hazard location discriminating circuit, an alarm transmitter and a modulator corresponding thereto of an alarm receiving panel.
Figure 2:
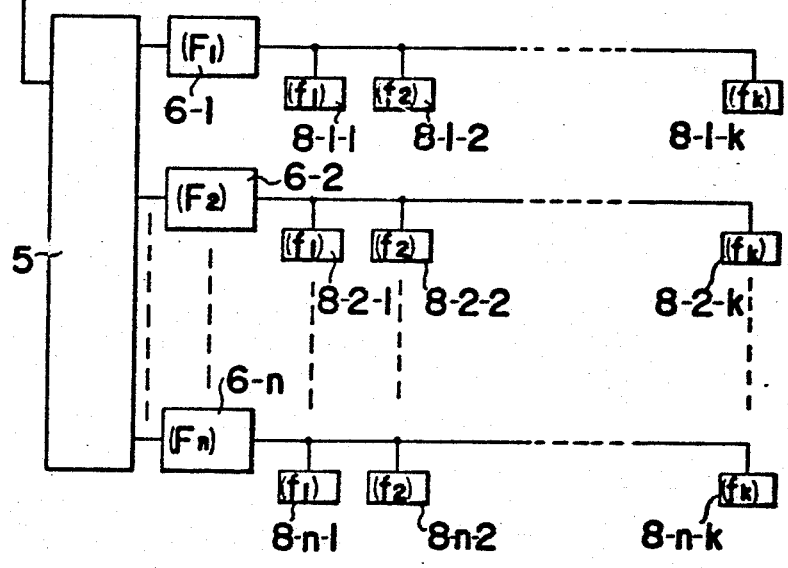

FIG. 2 shows the detailed construction of the receiving panel 4. As shown, the receiving panel 4 comprises a plurality of demodulators 11-1 through 11-$n$ each provided with a first bandpass filter, not shown, and corresponding to each group unit distributors 17-1 through 17-$n$, low frequency amplifiers 12-1 through 12-$n$, relays 13-1 through 13-$n$, first display devices in the form of lamps 14-1 through 14-$n$, second display devices in the form of lamps 16-1 through 16-$k$ corresponding to respective low frequencies $f_1$ through $f_k$ of the alarm signals, and second bandpass filters 15-1 through 15-$k$. Relays 13-1 through 13-$n$ are provided with contacts 13-1-$a$, 13-1-$b$ through 13-$n$-$a$, and 13-$n$-$b$. Relay contacts 13-1-$a$ through 13-$n$-$a$ of respective relays are connected to first display lamp 14-1 through 14-$n$, whereas contacts 13-1-$b$ through 13-$n$-$b$ are connected between respective distributors 17-1 through 17-$n$ and a common terminal 18. Series connected second bandpass filter 15-1 through 15-$k$ and second display lamps 16-1 through 16-$k$ are connected in parallel to the common terminal 18.

The distributor 17 is a low frequency distributing circuit composed of resistance elements and capacitance elements and is a known device.

The circuit shown in FIG. 2 operates as follows:

Assume now that alarm signal generator 8-$n$-1 (see FIG. 1) generates an alarm signal having a low frequency of $f_1H_z$. This alarm signal is modulated in modulator 6-$n$ by a high frequency carrier signal having a frequency of $F_n$ and the modulated signal is sent to the receiving panel as described hereinabove. In the receiving panel 4, the modulated signal is demodulated by corresponding demodulator 11-$n$, and a portion of the demodulated signal is applied to amplifier 12-$n$ through a distributor 17-$n$ for operating relay 13-$n$, thus lighting first display lamp 14-$n$. Upon energization of the relay 13-$n$, a portion of the demodulated signal is applied through contact 13-$n$-$b$ of relay 13-$n$ upon the group of second filters 15-1 through 15-$k$ corresponding to the alarm signal generator 8-$n$-1. In this example, since the alarm signal generated has a frequency of $f_1H_z$, second filter 15-1 will pass the demodulated signal to light second display lamp 16-1.

In the same manner, when alarm signal generators 8-1-1 and 8-2-$k$ operate, display lamps 14-1, 16-1, 14-2 and 16-$k$ are lighted.

When the alarm system of this invention is applied to a CATV system of a building, if it is predetermined that first display lamps 14-1 - 14-$n$ designate the floors of the building whereas second display lamps 16-1 through 16-$k$ rooms or areas to be watched on the same floor, then it is possible to accurately locate the spot of the hazard with a glance at the receiving panel, thereby enabling the taking of appropriate steps.

As can be noted from the foregoing description, according to this invention, it is not necessary to provide a plurality of low frequency bandpass filters for respective demodulators, but it is necessary to provide such low frequency bandpass filters of a number equal to the number of divisions of the low frequencies, in other words, where $n \times k$ alarm signal generators are associated with modulators 6-1 through 6-$n$, then the required number of low frequency bandpass filters is only $k$. Thus, as it is possible to construct the alarm system of this invention by using a reduced number of low frequency bandpass filters it is possible to reduce the cost of the receiving panel and hence the alarm system as a whole and to reduce the chance of fault of the alarm system.

What is claimed is:

1. An alarm system for subscribers having locations in group units and utilizing a bidirectional wired television system, and system comprising a plurality of alarm signal generators located at the subscribers locations, said signal generators generating low frequency alarm signals of frequencies common to respective of said group units, said frequencies being different for respective subscribers in respective group units, each of said alarm signal generators being provided for each subscriber; modulators for respective of said group units for modulating the low frequency alarm signals from said alarm signal generators with different high frequency carrier signals; and a receiving panel coupled to said modulators for receiving said modulated alarm signals; said receiving panel including a plurality of demodulators for respective of said group units first bandpass filters corresponding to said high frequency carrier signals utilized for modulation and connected to apply said modulated alarm signals to said demodulators, first display means connected to said demodulators for respective of said group units, a plurality of second bandpass filters corresponding to the low frequencies for respective of said subscribers, means to supply the outputs of all of said demodulators in common to all of said second bandpass filters, and second display means connected to the outputs of said second bandpass filters for providing second displays for respective of said subscribers.

2. The alarm system according to claim 1 which further comprises an antenna, a bidirectional amplifier connected to said modulators, and a signal separator connected in series between said antenna and said bidirectional amplifier, said separator being connected to said receiving panel.

3. The alarm system according to claim 1 comprising a hazard sensor for each subscriber, each group unit comprising a plurality of splitters connected to one of said modulators, each splitter being connected to a television set of one of said subscribers, and an alarm signal generator for each subscriber connected to a respective said hazard sensor.

* * * * *